Jan. 2, 1968  JAMES E. WEBB  3,361,400
ADMINISTRATOR OF THE NATIONAL AERONAUTICS
AND SPACE ADMINISTRATION
CLAMPING ASSEMBLY FOR INERTIAL COMPONENTS
Filed Dec. 27, 1966  3 Sheets-Sheet 2
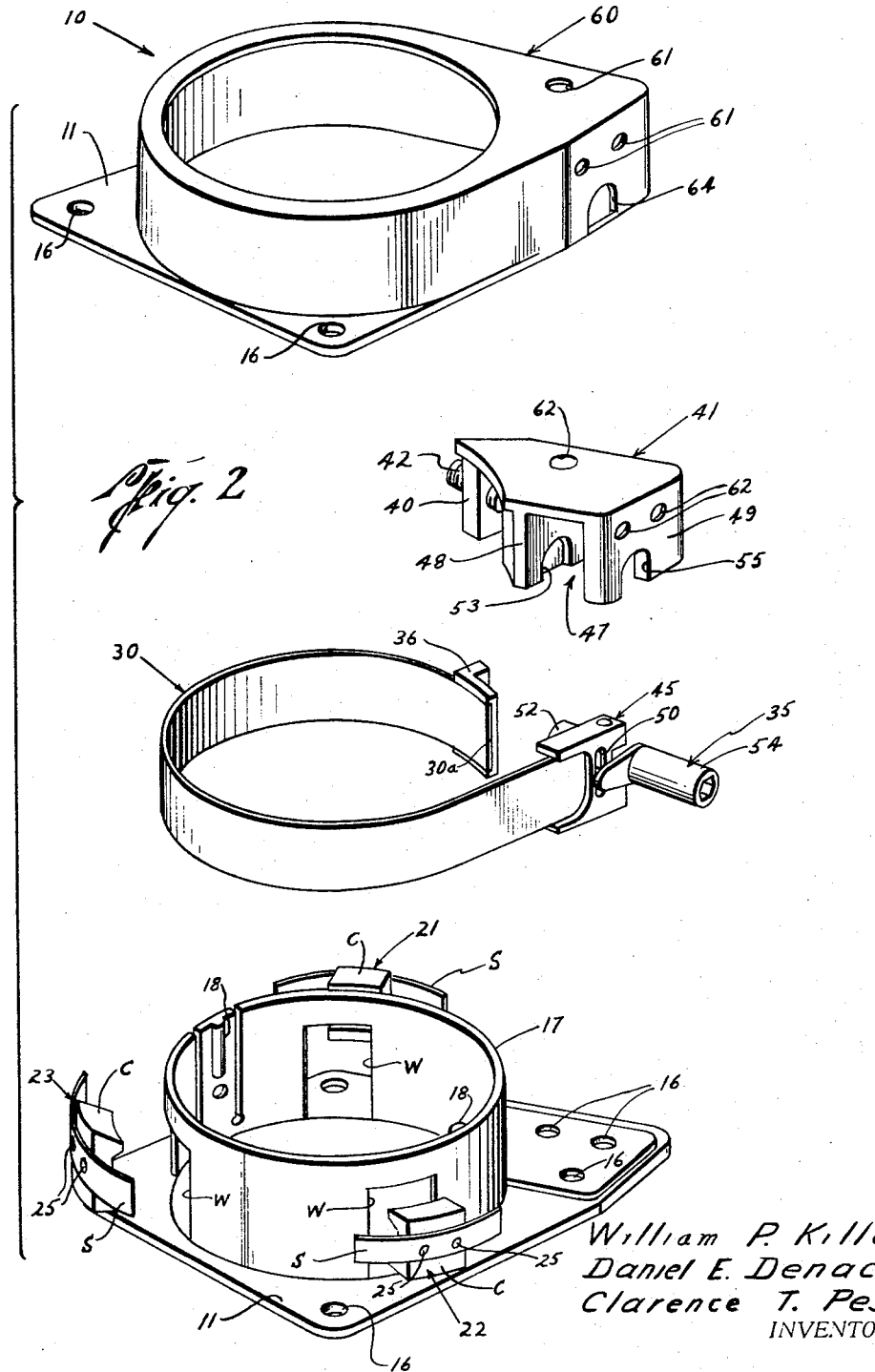
William P. Killalea
Daniel E. Denaci
Clarence T. Pesek
INVENTORS
ATTORNEYS Jan. 2, 1968           JAMES E. WEBB          3,361,400
ADMINISTRATOR OF THE NATIONAL AERONAUTICS
AND SPACE ADMINISTRATION
CLAMPING ASSEMBLY FOR INERTIAL COMPONENTS
Filed Dec. 27, 1966                       3 Sheets-Sheet 3
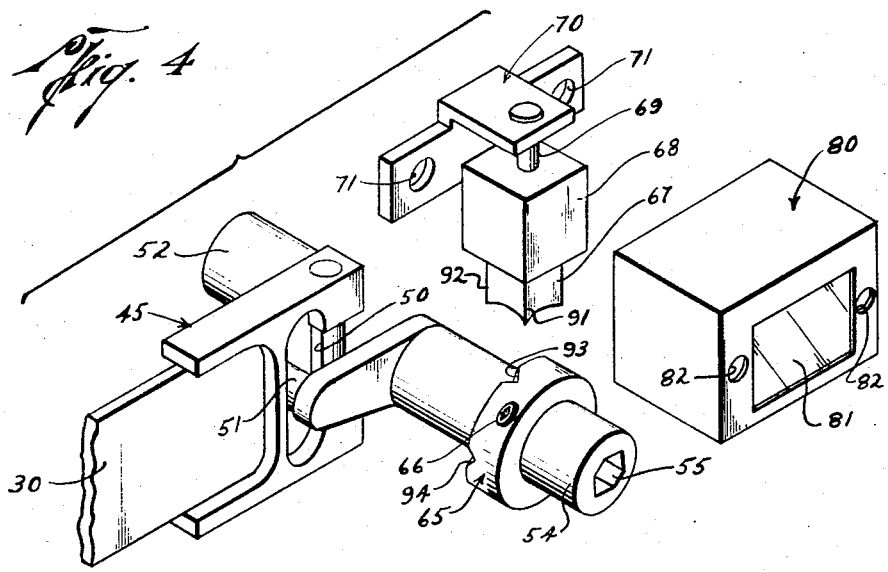
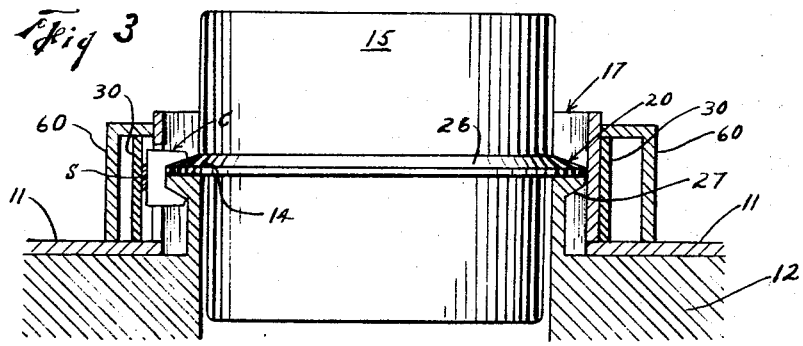
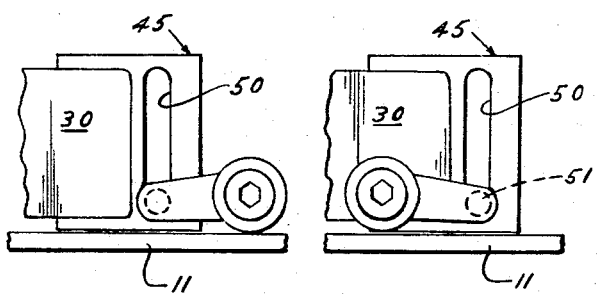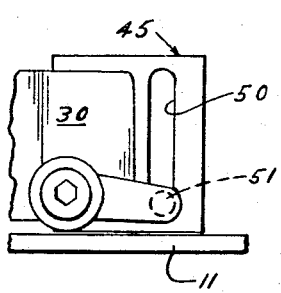
William P. Killalea
Daniel E. Denaci
Clarence T. Pesek
          INVENTORS
BY
ATTORNEYS

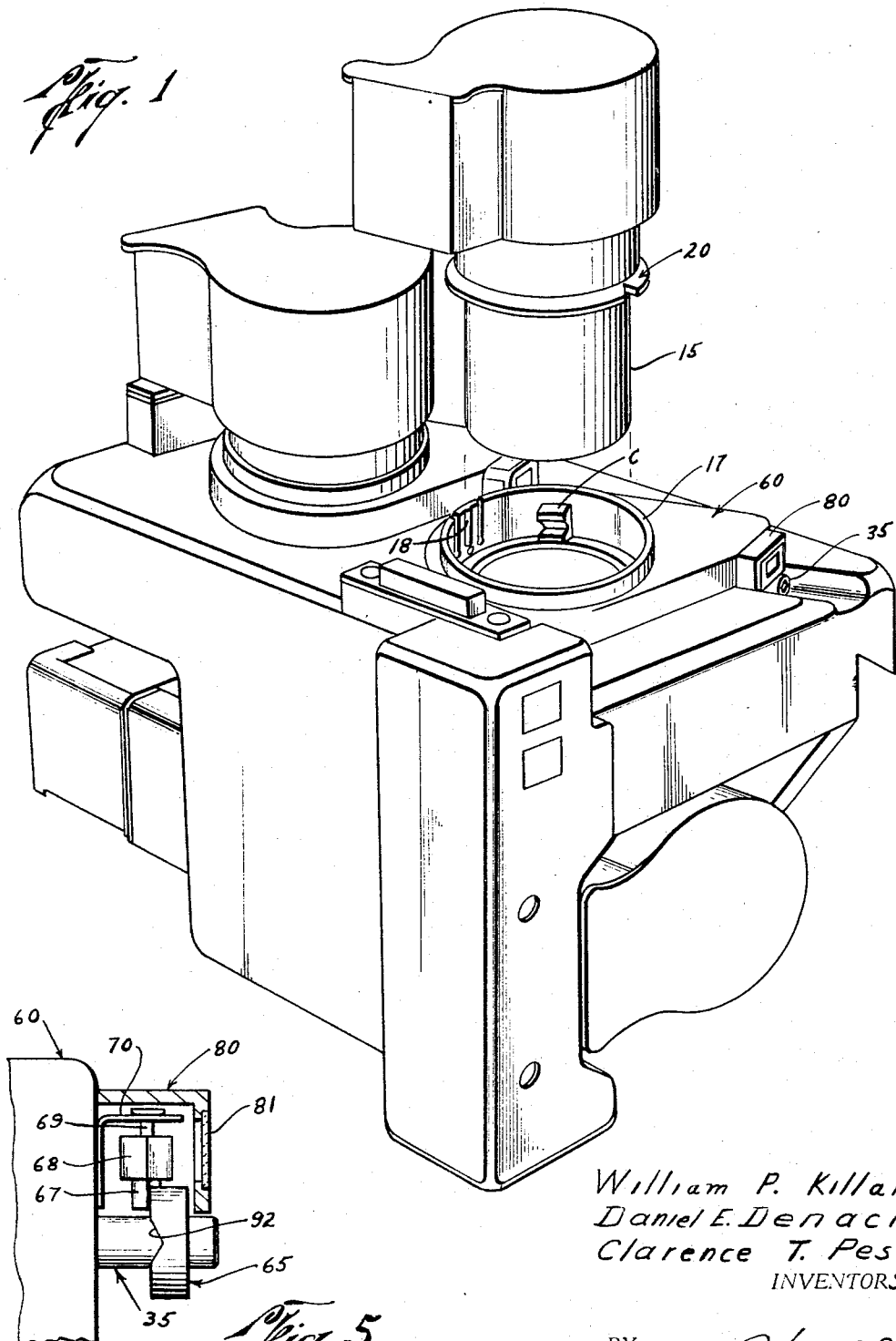

United States Patent Office 3,361,400
Patented Jan. 2, 1968

3,361,400
CLAMPING ASSEMBLY FOR INERTIAL
COMPONENTS
James E. Webb, Administrator of the National Aeronautics and Space Administration, with respect to an invention of William P. Killalea, Daniel E. Denaci, and Clarence T. Pesek
Filed Dec. 27, 1966, Ser. No. 608,247
7 Claims. (Cl. 248—27)

ABSTRACT OF THE DISCLOSURE

A clamping assembly for inertial components. A hollow cylindrical receptable is mounted axially perpendicular to a base plate which is boltable to the platform in which the inertial components are to be mounted. The cylinder inner wall is formed with protrusions which mate with grooves in the exterior of the inertial component whereby the component is accurately oriented and precluded from rotation. A plurality of clamping shoes which are spring-biased outwardly of the cylinder are movable inwardly through windows of the cylinder by a flexible band which is constrained in a loop encompassing the clamp shoes, and is tightenable by a crank mechanism to move the shoes against the inertial component. By turning the crank to loosen the band, the constraint imposed on the springs urges the shoes outwardly to provide instantaneous release. The crank cooperates with an indicator with different colored faces which indicate whether the component is locked or unlocked, or whether the clamping assembly is in a transitional phase between clamping and non-clamping conditions.

The invention described herein was made in the performance of work under an NASA contract and is subject to the provision of Section 305 of the National Aeronautics and Space Act of 1958, Public Law 85–568 (72 Stat. 435; U.S.C. 2457).

This invention relates to a clamping assembly for inertial components, and more particularly to a mechanism for clamping the inertial components of a space vehicle guidance and control system onto a conventional mounting platform.

The guidance and control system of a spacecraft includes a large number of inertial components such as gyros and accelerometers which, in the event of failure or malfunction, must be readily replaceable. This is particularly important when replacement is to be accomplished by an astronaut in the circumstances of wearing an inflated pressure suit and with possible unfavorable lighting conditions as when the space vehicle is operating in a "power-down" condition. Heretofore, such components were held rigidly in place by bolting, or in a similar manner, such that removal and replacement involved considerable time and difficulty.

The clamping assembly of this invention, which has been devised to overcome the attendant disadvantages of the prior art devices, comprises a base member which is boltable to the platform in which the spacecraft's inertial components are mounted. A hollow cylindrical member which is adapted to receive the inertial component is mounted with its axis perpendicular to the base member and is provided with an inner diameter only slightly greater than the greatest outer diameter of the inertial component it is to receive. The inner wall of the cylinder is formed with protrusions which are adapted to mate with grooves provided in a radial flange in the exterior of the inertial component, whereby the particular inertial component can be accurately positioned and oriented in the cylinder while also being precluded from rotational movement therein. For holding the inertial component fixed, a plurality of clamp-shoe assemblies are provided in which the clamp-shoes are normally spring-biased outwardly of the cylinder, but are adapted to be moved inwardly through windows in the cylinder for mating snugly against the inertial component. The shoes are movable by means of a flexible steel band which is disposed in a loop encompassing all the clamp-shoes and is tightenable by means of a crank mechanism to thereby move the shoes against the inertial component. The crank extends through a housing placed over the inertial component and band assembly, and includes an off-set portion which extends through a slot in the band. As the crank is rotated, the band is tightened by camming action of the crank against the side of the slot. The crank also mechanically cooperates with a indicator mechanism which can be seen through a window of the housing to indicate whether the inertial component has been locked in place.

The advantage of this invention, both as to its construction and mode of operation, will be readily appreciated as the same become better understood by reference to the following detailed description when considered in connection with the accompanying drawings in which like reference numerals designate like parts throughout the figures thereof and wherein:

FIG. 1 is an exploded view of the clamping assembiy of this invention;

FIG. 2 is a perspective, partly exploded view of a typical mounting platform for inertial components and showing the arrangement of the clamping assembly therein;

FIG. 3 is a diametric sectional view showing the clamping assembly in its operative clamping condition;

FIG. 4 is an exploded view of a crank mechanism for tightening the flexible band which actuates the clamp-shoes of the clamping mechanism and the indicator mechanism associated therewith for indicating whether the inertial component is locked in place;

FIG. 5 is a side view of the indicator mechanism shown in FIG. 4;

FIG. 6 shows the relative position of the crank and the flexible band in the unlocked condition of the clamping assembly of FIG. 1; and FIG. 7 shows the relative position of the crank and the flexible band in the locked condition of the clamping assembly of FIG. 1.

Referring more particularly to FIGS. 1 through 3 of the drawings, the clamping assembly 10 of this invention comprises a flat base member 11 having a circular opening therein whereby it may be placed on a mounting platform 12 for inertial components in encircling relation to an annular seat 14 for the inertial component 15. The base 11 is also provided with bolt holes 16 whereby it may be bolted to the mounting platform.

A hollow cylindrical member 17 is mounted to the base 11 by welding, or the like, or it might be integrally formed therewith. The cylinder 17 is disposed with its axis perpendicular to the base and coincident with the center of the circular opening in the base. The cylinder 17 is also provided with an inner diameter corresponding to the diameter of the base opening which is slightly larger than the greatest diameter of the inertial component. Also, the inner wall of the cylinder is formed with diametrically opposed protrusions 18 which are adapted to mate with corresponding grooves in an exterior radial flange 20 of the inertial component. The protrusions 18 permit accurate positioning and orientation of the inertial component within the cylinder and also prevent any rotation of the inertial component relative to the seat 14.

A plurality of clamp shoe assemblies 21, 22, 23 are provided for clamping the inertial component in fixed position on the platform seat 14 within the cylinder 17.

Each clamp shoe assembly comprises a clamp shoe C and a flexible leaf spring member S or arcuate shape which is secured to the back of the shoe by screws 25, or the like. The clamp shoes are disposed on the concave sides of the spring members and are adapted to be moved inwardly through windows W provided in the cylindrical member 17 for mating snugly against the top surface 26 of the radial flange 20 of component 15 and a downwardly facing shoulder 27 of the platform seat 14, as shown in FIG. 3. Each shoe member is formed with a horizontal groove in its clamping surface, as shown in FIG. 1, for mating with the bevelled surfaces 26 and 27 of the inertial component and the platform seat, respectively. However, each flexible spring member S is of such a length as to extend on either side of the clamp shoe C and is formed with a radius of curvature which is less than the radius of curvature of the cylinder 17. Thus, the shoes are normally held in a retracted withdrawn position relative to the cylinder 17 by the biasing action of the springs whose ends engage the outer surface of the cylinder. To provide for uniform clamping, the windows are equiangularly spaced as to their location in the cylinder, and in addition the clamping surface of each shoe is curved to conform to the curved outer surface of the inertial component it is to engage.

Movement of the clamp shoes is accomplished by means of a normally straight flexible steel band 30 which is disposed in a loop encompassing all of the shoes, and is tightenable by means of a crank 35 which cooperates therewith to move the shoes against the inertial component. One end 30a of the band is provided with an appendage 36 which is secured to one leg 40 of a three-legged anchor member 41 by means of a screw 42. The anchor member, which also serves as a crank housing for crank 35 is bolted to the base plate 11 at one corner thereof. The other end of the band is provided with a fastener member 45 which forms an extension of the band 30 and is cooperative with the crank 35 for tightening or loosening the band 30.

The fastener member 45 seats in a recess 47 in the anchor 41 between the legs 48 and 49, but is adapted for sliding movement therein. The crank 35 is provided with an offset portion 51 which extends through a vertical slot 50 in the band fastener member 45. One end 52 of the crank is seated in a recess 53 provided in the anchor leg 48, and the other end portion 54 of the crank extends through an opening 55 which is formed at the bottom of the anchor leg 49. Thus, as the anchor 40 is bolted to the base 11, the crank shaft is held against the flat base 11 with one end seated in the recess 53 and the offset portion 51 of the shaft permitted limited arcuate movement between the anchor legs 48 and 49. To facilitate rotating the crank, the crank end is provided with a hexagonal opening 55 for receiving a key (not shown).

It should therefore be apparent, as best shown in FIGS. 6 and 7, that as the crank is rotated about its axis in the clockwise direction, the offset portion of the crank cams against the right side of the slot 50, thereby moving the fastener 45 and the end of the band which is secured thereto to the right to the position shown in FIG. 7. The clamp shoe assemblies are thus urged inwardly through the windows of the cylinder 17 by the tightening band until they engage the inertial component which is seated within the cylinder on the seat 14. Since the crank is turned until the offset portion has moved over slightly more than 180° of arc in the position opposite to that shown in FIG. 6, the flexible band, which tends to unwind, urges the offset portion of the crank against the flat base member 11, as shown in FIG. 7, thereby locking the band in its tightened position around the clamp shoes.

For protecting the band, the clamp shoe assemblies, and the crank mechanism, a cover 60 is provided which is boltable to the anchor member 41. For this purpose the cover is provided with bolt holes 61 which are disposed to align with corresponding bolt holes 62 in the anchor 41. The top 63 of the cover is provided with a circular opening which substantially conforms to the outer diameter of the cylinder 17, whereby it may be sleeved around the cylinder in continuous engagement therewith, as shown in FIG. 3. In addition, the bottom edge of the cover is provided with an arched opening 64 through which the crank shaft extends, as shown in FIG. 2.

To indicate whether the inertial component has been locked in place, an indicating mechanism is provided which is cooperatively associated with the crank 35. As shown in FIGS. 4 and 5, the crank shaft is provided with a small ring gear 65 which is sleeved over the shaft and securely attached thereto by a set screw 66. The ring gear is attached to cooperate with a small four-toothed gear 67 which is mounted in a position to mate with the notches in the ring gear upon rotation of the crank. For this purpose the gear 67 depends from the lower end of an indicator member 68 which, in turn, is rotatably mounted on the end of a shaft 69 in the form of a rivet or screw vertically suspended from an L-shaped bracket 70. The bracket 70 is provided with holes 71 in one arm thereof for attachment to the housing by screws, or the like, and is in the form of a resilient spring member which is slightly flexed so as to urge the gear 67 in contact with the ring gear 65.

The indicator member 68, which is integrally formed with the gear 67 or otherwise fixedly secured thereto, is formed with four sides or faces, one of which is colored black, another with black and yellow stripes, and a third yellow. The colored faces are adjacent to one another in the order named, and are selectively exposed to view through a housing 80 which fits over the bracket 70 and the indicating mechanism suspended therefrom. The housing is provided in its front face with a glass window 81 to permit viewing of the indicator member 68 and is also provided with holes 82 in its front face, whereby it may be attached by screws to the cover 60, although other attachment means might be used.

When the crank is in the position shown in FIG. 6 and the band is in loose condition, only the black face of the indicator may be seen through the window. When the crank has been rotated to lock the band assembly, as shown in FIG. 7, the indicator 68 has been turned 180° by successive engagement of the gear tooth 91 with the notch 93 of the ring gear and gear tooth 92 with the notch 94 so that only the yellow face of the indicator is visible through the window. If both black and yellow stripes are visible, the crank is in transition and the indicator 68 has only been turned 90° to indicate the component is not firmly locked.

It will therefore be seen that a unique clamping assembly for inertial components is described herein which may be easily operated by a simple turn of the wrist to securely lock an inertial component in place in its mounting platform. Furthermore, only a turn of the wrist is required to completely free the inertial component from all fetters whereby it may be easily lifted from the mounting platform. Release of the inertial component is accomplished by turning of the crank to the position shown in FIG. 6, whereby the loop defined by the band 30 assumes its greatest radial dimension. In this condition of the band, it releases its grip on the clamp shoes and the constraint imposed on the curved springs S which therefore operate to move the clamp shoes outwardly so as to instantly and simultaneously disengage the inertial component. Instantaneous positive release is therefore obtained with only a minimum of moving parts which is particularly significant in the hard vacuum of space where the possibility of cold welding exists. Although most parts of the clamping assembly of this invention are metallic, it may be desirable to fabricate some of the parts such as the cylinder 17 from Fiberglas so as to better withstand heat.

It is also to be noted that the clamping indicator provides an effective means for indicating the clamping condition of this invention. The spring-loaded indicator insures positive interaction with the crank and enhances the reliability of the indicator.

It should also be understood that the foregoing disclosure relates only to a preferred embodiment of the invention and that it is intended to cover all changes and modifications of the example of the invention herein chosen for the purposes of the disclosure and which do not constitute departure from the spirit and scope of the invention.

What is claimed and desired to be secured by Letters Patent is:

1. A clamping assembly for releasably clamping inertial components on to a mounting platform for inertial components, said clamping assembly comprising:
   a base member adapted to be secured to said mounting platform, said base member having an opening therein and an upright, hollow, substantially cylindrical member in registry with said opening whereby said base member and cylindrical member may be disposed in encircling relation to an inertial component when seated on said platform, said cylindrical member having a plurality of windows in the wall thereof;
   a clamp shoe member associated with each said window, each said shoe member having a clamping surface substantially conforming to the surface of the inertial component;
   resilient spring means attached to each said clamp shoe member which normally bias the clamp shoes in withdrawn retracted position relative to said cylindrical member, wherein the clamp shoes are disengaged from the inertial component;
   an anchor member fixed to said base member;
   a flexible resilient band secured at its ends to said anchor member and constrained in a loop disposed in encircling relation to said cylindrical member and clamp shoe members;
   a crank mechanism operatively associated with said anchor member and flexible band for selectively tightening the loop defined by said band, whereby said clamp shoe members may be urged by the band against the biasing action of said spring means into clamping relationship with said inertial component;
   means for releasably locking said flexible band in its tightened condition; and
   indicator means operatively associated with said crank mechanism for indicating when the inertial component is locked in clamped condition.

2. A clamping assembly as described in claim 1 wherein said inertial component is a gyroscopic device.

3. A clamping assembly as described in claim 1 wherein said inertial component is an accelerometer.

4. A clamping assembly as described in claim 1, further including cooperative means on said cylindrical member and the inertial component for accurately positioning and orienting the inertial component on said platform, and for preventing relative rotational movement between the inertial component and said cylindrical member.

5. A clamping assembly for releasably clamping inertial components on to a mounting platform for inertial components, said clamping assembly comprising:
   a base member adapted to be secured to said mounting platform, said base member having an opening therein and an upright, hollow, cylindrical member fixed on said base member in registry with said opening, whereby said base member and cylindrical member may be disposed in encircling relation to an inertial component when seated on said platform, said cylindrical member having a plurality of windows in the wall thereof;
   a clamp shoe member associated with each said window and disposed therein, each said shoe member having a clamping surface substantially conforming to the surface of the inertial component;
   a plurality of elongate resilient spring members, each of which is attached to a different one of said clamp shoe members, said spring members having an arcuate configuration with a radius of curvature which is less than the radius of curvature of said cylinder member and disposed with its ends in engagement with the external surface of said cylindrical member, whereby said clamp shoe members are normally biased outwardly of said windows in a withdrawn retracted position relative to said cylindrical member;
   an anchor member fixed to said base member;
   a normally straight resilient band secured at one end to said anchor member and constrained in a loop disposed in encircling relation to said cylindrical member and clamp shoe members;
   a crank means operatively associated with said anchor member and resilient band and rotatable between first and second rotational positions for tightening the loop defined by said band in the second rotational position of said crank means, whereby said clamp shoe members may be urged by the band against the biasing action of said spring means into clamping relationship with said inertial component; and
   cooperable means comprising said resilient band and said base member for releasably locking said crank means in said second rotational position.

6. A clamping assembly as described in claim 5 further comprising indicator means operatively associated with said crank means for indicating when the inertial component is locked in clamped condition.

7. A clamping assembly as described in claim 6 wherein said indicator means comprises a colored indicator member having at least three different colored faces, two of which are selectively displayed in accordance with said first and second rotational positions of said crank means, and the third of which is displayed when said crank means is in a rotational position intermediate said first and second rotational positions.

References Cited
UNITED STATES PATENTS

| | | | |
|---|---|---|---|
| 1,511,989 | 10/1924 | Hammond | 248—27 XR |
| 1,854,020 | 4/1932 | Crocker | 248—27 |
| 2,464,778 | 3/1949 | Wagstaff | 248—27 |
| 2,679,993 | 6/1954 | Christopherson | 248—27 |

DONALD A. GRIFFIN, *Primary Examiner.*